United States Patent [19]

Enns

[11] Patent Number: 4,512,687
[45] Date of Patent: Apr. 23, 1985

[54] CONVEYOR ASSEMBLIES FOR DETACHABLE MOUNTING TO A TRACTOR

[76] Inventor: Silvanus T. Enns, 14-224 Kennedy St., Winnipeg, Manitoba, Canada, R3C 1T1

[21] Appl. No.: 477,320

[22] Filed: Mar. 21, 1983

[30] Foreign Application Priority Data

Apr. 16, 1982 [CA] Canada ................................ 401170

[51] Int. Cl.³ .............................................. B65G 53/48
[52] U.S. Cl. ......................................... 406/41; 406/53; 280/472; 198/318
[58] Field of Search ................ 406/41, 53; 198/311, 198/316, 318, 319; 280/472, 473, 478 A

[56] References Cited

U.S. PATENT DOCUMENTS

| | | | |
|---|---|---|---|
| 2,768,838 | 10/1956 | Kramer | 280/472 |
| 3,070,243 | 12/1962 | Lippke | 406/41 |
| 3,169,782 | 2/1965 | Columbus | 280/478 A |
| 3,297,148 | 1/1967 | Andrews | 198/314 X |
| 4,344,723 | 8/1982 | Ellingson | 406/53 |
| 4,440,416 | 4/1984 | Claas et al. | 280/473 |

Primary Examiner—Jeffrey V. Nase
Assistant Examiner—L. E. Williams
Attorney, Agent, or Firm—Stanley G. Ade

[57] ABSTRACT

Present conveyors such as portable grain augers are most commonly positioned, raised and lowered manually and are powered by a small air-cooled engine, electric motor or a tractor power take-off. The disclosed conveyor system utilizes a tractor for all modes of transport, positioning, raising and lowering, and powering the conveyor. The undercarriage configuration allows a tractor to be coupled beside and in parallel with the conveyor. The undercarriage moves as a unit with the tractor but is freestanding when uncoupled. The tractor power take-off is utilized to drive the conveyor through the use of any one of several drive systems and the tractor electrical and hydraulic systems may be used to power controls for raising and lowering the conveyor. In grain augers, in addition to the mechanical auger flighting used to move the grain, a pneumatic system may also be adapted to this unit. Its function is primarily the same as that of present drag or clean-up augers which are used to move grain toward the auger intake during clean-up operations. The pneumatic system features only a suction stage with the grain being taken in through a suction hose and deposited into a cyclone above the auger flighting. The blower or fan is mounted on the undercarriage behind the tractor and is powered by the tractor power take-off independently of the auger flighting.

9 Claims, 10 Drawing Figures

CONVEYOR ASSEMBLIES FOR DETACHABLE MOUNTING TO A TRACTOR

BACKGROUND OF THE INVENTION

This invention relates to new and useful improvements for portable grain auger assemblies; particularly medium sized units which are frequently used for unloading as well as loading grain storages.

Conventionally, portable auger assemblies utilize a two-wheel undercarriage to support the auger tube and to transport it. Positioning the auger tube for loading a bin or truck is done manually as is raising and lowering of the auger tube. The auger intake is commonly kept full by gravity flow or manual shovelling during the unloading of a grain storage, although various types of drag augers are used where safety requirements allow.

Larger grain augers as well as the requirements for less manpower and more efficiency make it necessary for farm operators to look for better and easier ways of transporting, positioning and raising and lowering their grain handling augers. In addition, the cleaning out of many grain storages manually has become unacceptable so that operators are further searching for equipment which will help to reduce physical labor and increase efficiencies during this operation.

SUMMARY OF THE INVENTION

The present invention is designed to overcome the difficulties encountered in transporting and positioning many grain augers commonly used in loading and unloading grain bins and to provide a system with which a practical pneumatic conveying attachment may, if desired, be used to aid in grain bin clean out. This unit utilizes a conventional type of auger tube and couples beside a farm tractor, which then aids in transporting and positioning the unit as well as powering the auger flighting.

In accordance with the invention there is provided an undercarriage assembly for portable conveyors and the like, for mounting to a tractor having a power take-off; said assembly comprising in combination a freestanding tricycle undercarriage including a frame, a pair of spaced apart rear ground engaging wheels and a front castor wheel assembly mounted to said frame, means for detachably and adjustably securing said undercarriage to an associated tractor in side by side relationship, means for mounting a conveyor assembly on said undercarriage for movement from a transport position to a working position and vice-versa, said last mentioned means also adjusting the working height of the intake and outlet ends of the conveyor assembly, and means operatively connecting the conveyor assembly to the power take-off of the associated tractor.

In the preferred embodiment, the undercarriage couples to the side of the tractor through the use of the rear tractor hitch lug and a brace to the side of the tractor frame. The frame configuration utilizes a single front castor wheel and two rear wheels with the tube being positioned above the undercarriage and thus to the side of the tractor.

The lift system for the auger tube preferably consists of linkages which allow both the intake height and the outlet height of the auger to be controlled. The rear linkage may be controlled by a hydraulic cylinder powered by the tractor hydraulic system. The front linkage is connected between pivots on the undercarriage frame and a track running underneath the auger tube. A cable and winch system then controls the positioning of the top of this linkage along the track.

The drive system between the tractor power take-off and the auger tube flighting may take several forms. The simplest of these is a direct shaft drive system where an additional gear box is placed on the undercarriage behind the tractor and a conventional drive system on the auger tube is used. In this case two telescopic drive shafts are used to connect the tractor power take-off and undercarriage gear box with the auger tube gear box.

An alternative mechanical drive system or embodiment which utilizes an intermediate belt drive to replace the requirement of a second telescopic drive shaft between the two gear boxes, has the advantages of allowing a longer unobstructed auger tube intake section for reaching into bins during unloading, and allowing the auger flighting to be turned in reverse for clean-out. With this sytem, the pulley axes of the belt drive are the same as those of the rear lift linkage pivots so that the drive belt tension remains constant for any tube position.

A third alternative is a hydraulic drive system. With this system the tractor power take-off drives a hydraulic pump mounted on the undercarriage frame behind the tractor. Hydraulic hoses and tubes are then used to connect the pump and reservoir to a hydraulic motor, mounted at either end of the auger tube, which powers the auger flighting. The primary advantage of this system is that the hydraulic oil flow can be controlled, thus allowing the operator to vary both the speed and direction of auger flighting rotation.

A pneumatic conveying attachment may also be incorporated into this system for grain bin clean-out. This attachment consists of a fan or blower mounted on the undercarriage, a cyclone mounted above the auger flighting, a flexible intake suction hose and nozzle and a connecting duct between the blower and cyclone. The blower is driven by the tractor through an independent belt drive from that of the auger flighting. During operation, grain is sucked through the manually positioned hose to the cyclone, from where it drops into the auger flighting. The advantage of this system is that it allows grain to be dumped into the auger system during bin clean-out without requiring shovelling or the use of drag augers. System efficiency is high since the pneumatic attachment uses only a suction stage and is only operated after gravity flow into the auger flighting no longer occurs.

It is also recognized that the undercarriage for this unit is potentially useful for other types of conveyors such as those used for handling hay bales or industrial materials. In such cases, a chain or belt conveyor would replace the auger tube with the screw flighting.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figures 1, 3:
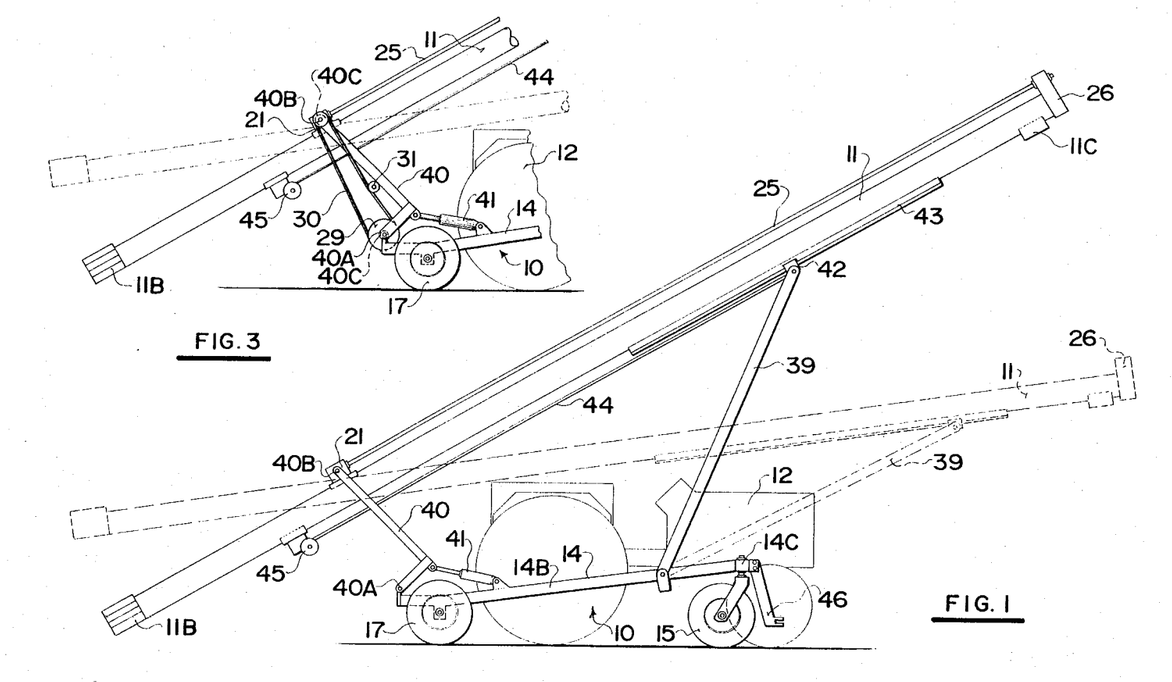
FIG. 1 is a side elevation of the auger system shown coupled to a tractor and using a direct shaft drive system to power the auger flighting from the tractor power take-off.
FIG. 3 is a fragmentary side elevation of the auger system shown coupled to a tractor and using an intermediate belt drive in the drive train from the tractor power take-off to the auger flighting.
Figures 2, 9:
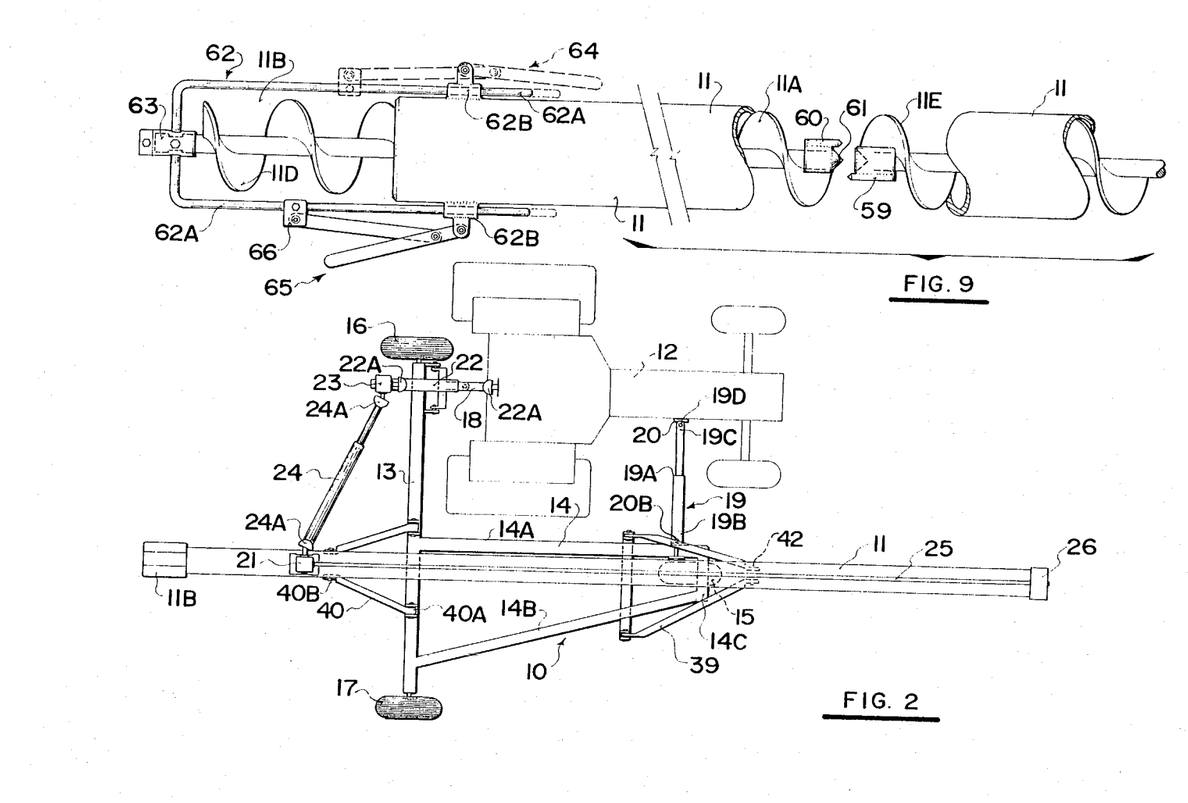
FIG. 2 is a top plan view of FIG. 1.
FIG. 9 is a fragmentary top plan view of a system for disengaging the intake section of the auger flighting when only the pneumatic intake is being used.

FIGS. 1 and 2 illustrate views of an undercarriage assembly collectively designated 10 attached to and supporting a conventional auger tube 11 and flighting 11A and coupled to the tractor 12. The position shown in phantom in FIG. 1 shows a lowered tube position used for transport. The frame 14 of the undercarriage is supported by a single front castor wheel assembly 15 positioned beside the front of the tractor and two rear wheels 16 and 17 positioned behind and beside the rear of the tractor respectively, one upon each end of the relatively wide rear axle or transverse frame member 13, giving a tricycle type undercarriage.

The frame 14 includes a longitudinal member 14A extending forwardly from the axle or transverse frame member 13 and a diagonal member 14B also extending forwardly from the axle 13 and converging to a front transverse member 14C, extending from the front end of the frame member 14A upon which the castor wheel assembly 15 is mounted.

The undercarriage 10 is attached to the tractor through a short hinged rear hitch 18 which is pinned to the tractor drawbar and a side brace 19 which is pinned to a hitch lug 20 bolted on the front or side of the tractor frame. These two hitch members cause the undercarriage to maintain a constant position relative to the tractor.

The side brace 19 to the tractor is adjustable in position laterally and longitudinally. It consists of a bracket 20A with a vertical pin 20B clamped to the undercarriage frame for adjustable positioning therealong, a lengthwise adjustable telescopic member 19A with a lug 19B and 19C on each end respectively for the pin connections and the bracket or lug 20 with a vertical pin 19D bolted on the tractor frame. This arrangement is illustrated in detail in FIG. 10.

Referring again to FIGS. 1 and 2, the tractor is coupled to the unit by first backing into position and pinning the rear hitch 18 to the tractor drawbar. Then the side brace 19 is positioned and pinned to the tractor frame lug 20. If the tractor is not initially lined up parallel with the undercarriage it may be moved after the rear hitch is coupled until the tractor and undercarriage align themselves. The power take-off and all hydraulic and electrical connections are made following this.

Uncoupling the tractor follows the reverse procedure.

Several alternative drive systems for the auger flighting are practical. The embodiment illustrated in FIGS. 1 and 2 uses a direct shaft drive system to power the auger flighting from the tractor power take-off. The drive train to the auger tube gear box 21 consists of a telescopic drive shaft 22 with universal joints 22A, running from the tractor power take-off to a right angle undercarriage gear box 23, and a second telescopic drive shaft 24 with universal joints 24A running from the undercarriage gear box 23 output to the auger tube gear box 21. The auger tube gear box 21 is placed relatively close to the auger inlet 11B so that variations in the height of the auger gear box input shaft do not become excessive as the angle of inclination of the auger tube is varied. The rest of the drive system to the flighting is conventional with a drive shaft 25 to either the top or bottom of the auger tube and a chain or gear drive assembly 26 connecting it to the auger flighting in the usual way.

Figure 4:
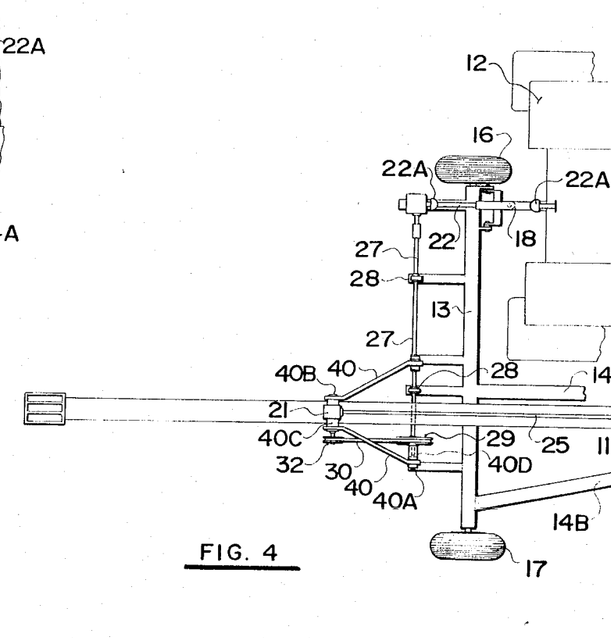
FIG. 4 is a top plan view of FIG. 3.

FIGS. 3 and 4 illustrate a second mechanical drive system or embodiment with an intermediate belt drive. This system allows the auger tube gear box 21 to be placed further from the auger intake in order to increase the intake reach for emptying bins, and allows the flight rotation direction to be reversed for clean-out by twisting the drive belt. The drive train consists of the telescopic drive shaft with universal joints 22 running off the tractor power take-off, the right angle undercarriage gear box 23, a cross shaft 27 supported by bearings 28, extending from the gear box 23 outlet, a driver pulley 29 on the distal end of shaft 27, a drive belt 30 with a conventional belt tightener 31, a driven pulley 32 on the auger tube gear box 21 and a conventional shaft drive system 25 to the end of the auger flighting via drive 26.

Figure 5:
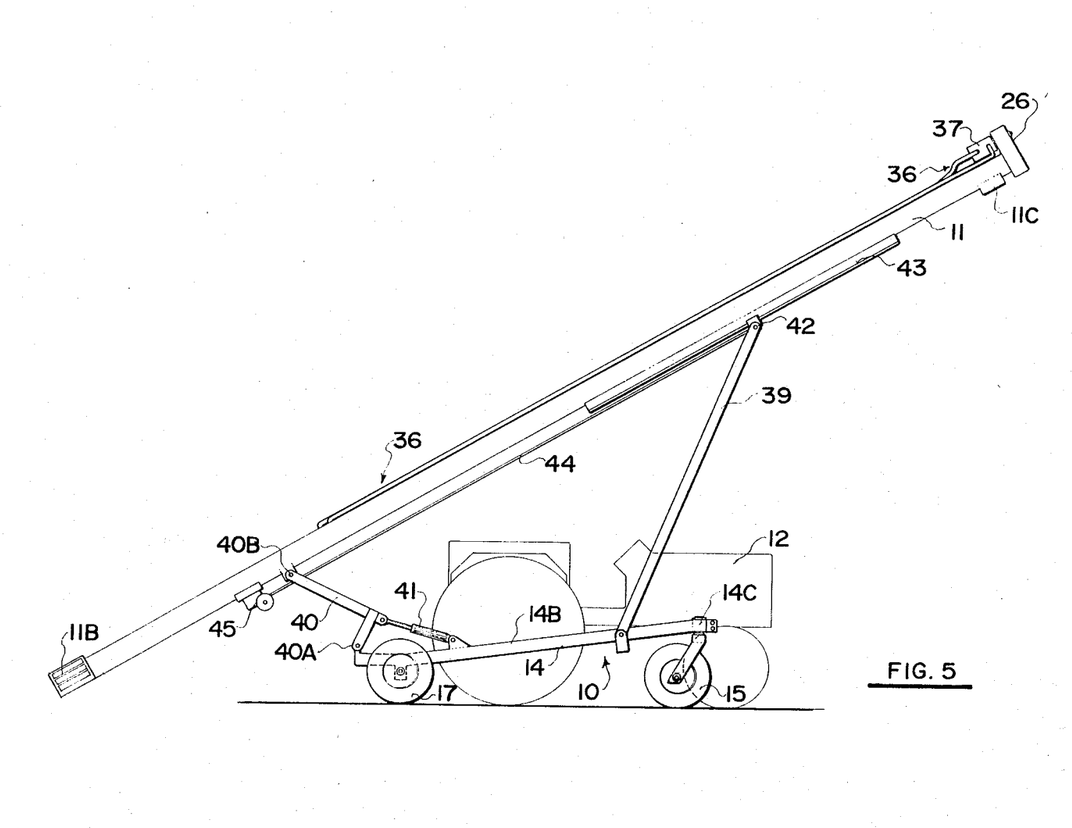
FIG. 5 is a side elevation of the auger system shown coupled to a tractor and using a hydraulic drive system to power the auger flighting.
Figures 6, 10:
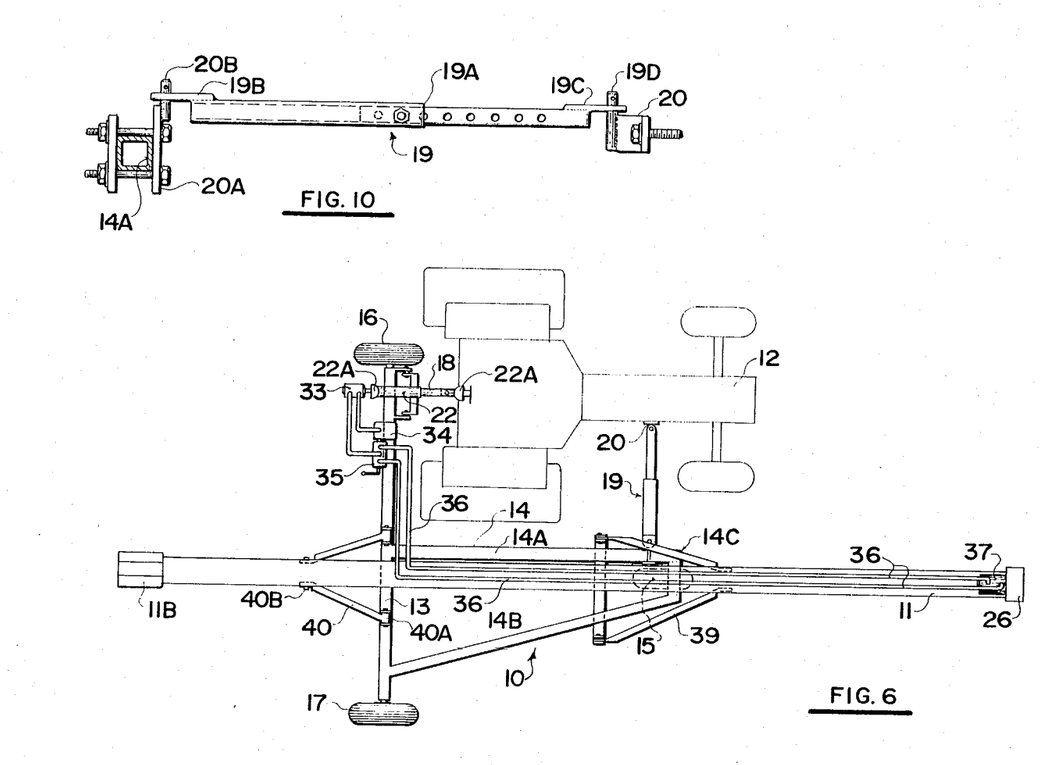
FIG. 6 is a top plan view of FIG. 5.
FIG. 10 is a side elevation of the side brace per se used to couple the undercarriage to the tractor side frame.

The third alternate drive system or embodiment consists of a hydraulic system illustrated by FIGS. 5 and 6. A hydraulic pump 33, along with an oil reservoir 34 and conventional valve controls 35, are mounted on the undercarriage axle 13 behind the tractor 12 and are connected to the tractor power take-off through the telescopic drive shaft 22 with universal joints 22A. Hydraulic lines 36 extend from the pump and reservoir to the auger tube and then along it to a hydraulic motor 37 mounted at the upper end of the auger tube. This motor powers the auger flighting through the chain or gear drive 26. The valve controls at the pump act to control both the oil flow and direction of flow so that both the flighting speed and direction of rotation may be controlled.

In all embodiments the auger tube 11 is supported above the undercarriage 10 by a set of lift linkages, front linkage 39 and rear linkage members 40. The rear lift linkage members, in the form of bell cranks, pivot at the rear of the undercarriage frame and at the attachment point to the auger tube and are controlled by a double acting hydraulic cylinder 41 which is powered by the tractor hydraulics. On the embodiment of FIGS. 3 and 4, using a belt drive for the auger flighting, the pivot axes 40A and 40B, of the lift members coincide with the center lines of the cross shaft 27 and auger tube gear box input shaft respectively, so that the drive belt tension remains the same for any position of the rear lift arms. This is made possible by having the top of the rear linkage pivot about a pipe 40C on the auger tube gear box through which the gear box input shaft runs and by having the bottom pivot about a pipe 40D through which the cross shaft runs.

The front lift linkage members 39 pivot at the undercarriage frame members 14A and 14B behind the front castor wheel assembly 15 and converge to be attached at the top or upper ends to a slider or roller 42 which runs along a track 43 secured underneath the auger tube. A cable 44 is then used to control the position of this slider or roller. The take-up of the cable may be controlled by a winch 45 operated manually, electrically or hydraulically, mounted on the underside of the auger tube or, if desired, on the undercarriage frame or lift linkages, depending upon design parameters.

For long distance transport this unit may also be towed in a forward direction behind another vehicle by using a tow hitch 46 as illustrated by FIG. 1. This hitch is bolted to the front of the undercarriage frame and extends downwardly therefrom and carries all the weight normally carried by the front castor wheel during regular operation. For hook-up to the tow vehicle the front of the undercarriage is jacked up until the hitch lug height matches that of the tow vehicle. The front castor is therefore lifted free of the ground for smoother towing.

Figure 7:
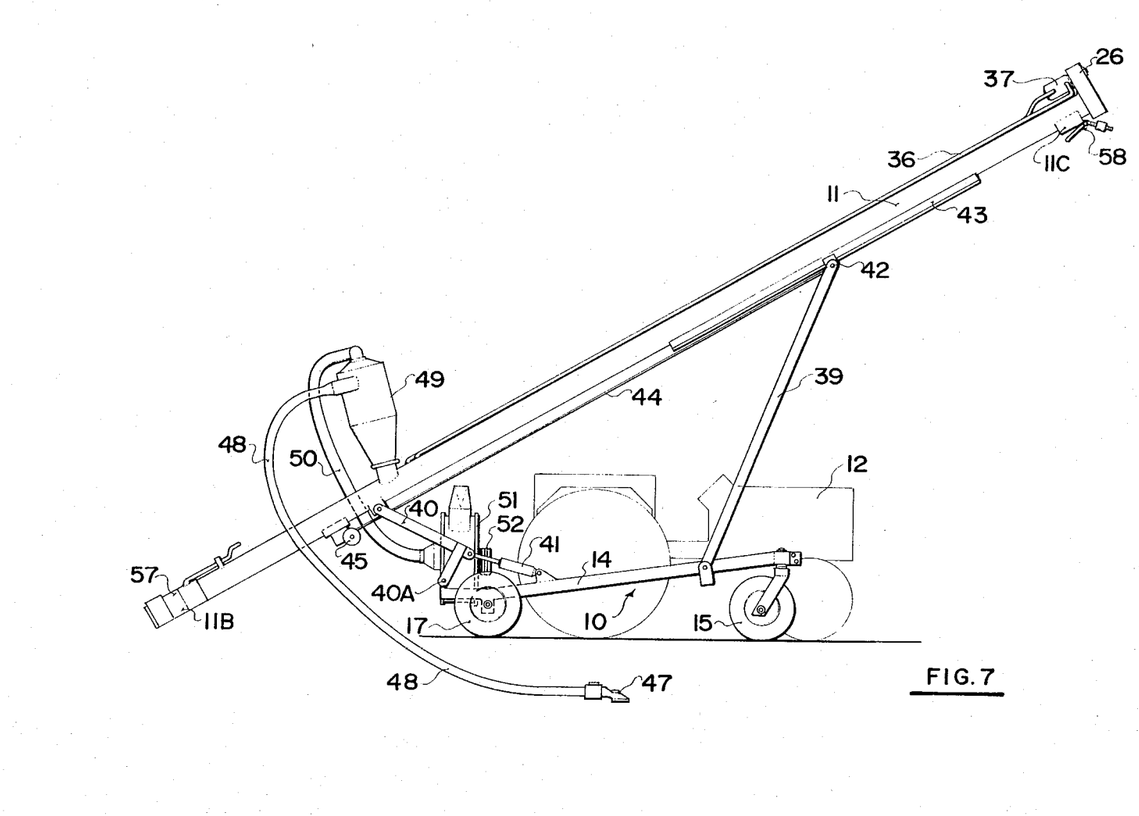
FIG. 7 is a side elevation of the auger system complete with the pneumatic conveying attachment mounted on the unit.
Figure 8:
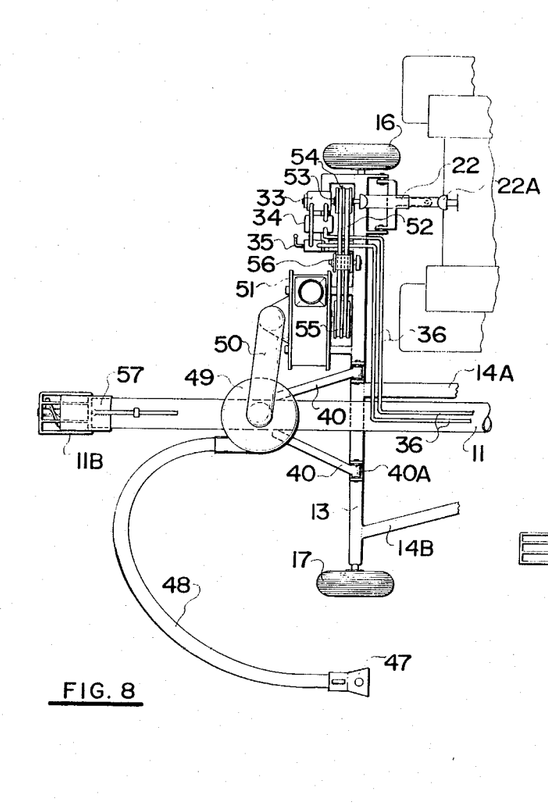
FIG. 8 is a fragmentary top plan view of FIG. 7.

An optional pneumatic conveying portion of the system is shown in FIGS. 7 and 8. This system uses only a suction stage with the mechanical auger flighting acting to elevate the grain beyond the cyclone. Components include the suction nozzle 47, suction hose 48, conventional cyclone 49, duct hose 50, centrifugal fan 51 and a fan drive 52.

The centrifugal fan 51 is mounted on the rear of the undercarriage behind the tractor and is driven from the tractor power take-off shaft through an intermediate belt drive 52. The telescopic drive shaft 22 with universal joints 22A connects between the tractor power take-off and a counter shaft 53 on which the driver pulley 54 is mounted. This counter shaft also extends to power the undercarriage gear box 23 or hydraulic pump 33, depending upon which embodiment the pneumatic system is being used with. In FIGS. 7 and 8 the hydraulic system of FIGS. 5 and 6 is shown. The driven pulley 55 is mounted on the fan shaft and a heavy belt tensioning idler pulley 56 is used to engage and disengaged the belt drive through a threaded screw linkage (not illustrated). The centrifugal fan may be replaced by a positive displacement blower if increased pressures for additional suction capacity are required.

The air exhaust from the fan is released into the atmosphere while the intake is connected to the top of the cyclone 49 through the use of a flexible air duct hose 50. The suction hose 48 attaches to the cyclone at the side of the cyclone near the top. Air and grain are thus drawn into the suction nozzle, which is of conventional design, and along the suction hose into the cyclone. Here the reduced air flow velocity allows the grain to separate and fall into the auger flighting by gravity, while the air is further drawn out through the duct and into the fan. The lower or discharge end of the cyclone 49 is operatively connected to the auger flighting 11A through the auger tube 11.

A rotary air lock is not required at the bottom of the cyclone since very little air can be drawn into the cyclone from along the auger flighting. However, a sliding gate 57 is provided at the inlet of the auger flighting to provide an air seal here when the intake flighting is running empty. A counter-balanced hinged gate 58 at the auger outlet 11C is also used to seal the outlet as the system is started so that no air will be drawn in here. The gate partially opens under any grain pressure.

If a conventional rotary air lock is desired in place of the use of the inlet and outlet air seals this may be readily installed at the base of the cyclone and run with a light chain drive from the auger tube gear box or by a separate hydraulic motor.

The pneumatic portion of the system is designed to be utilized primarily when gravity flow of grain into the auger inlet cannot be provided or is limited. If the auger inlet is running empty as the suction hose is being used, the inlet section of the flighting, below the cyclone may be disengaged to reduce wear. This is done by utilizing a shaft coupling between the two sections of the flighting which can be disengaged from the intake end of the auger. FIG. 9 illustrates the components of this mechanism.

The lower section 11D of the flighting is driven from the top of the auger with pin 59 in the upper section 11E acting as the drive pin for the second or lower section of auger flighting and pin 60 acting as the driven pin. The two main shafts are kept aligned through the use of an alignment cone 61 with the male end of one section of the shaft engaging with the female ends. When the intake section 11D is disengaged, the intake flighting is pulled downward of the other section as clearly shown, thus separating the drive pins and aligning cones. This is done at the intake end of the auger by using a framework 62, attached to bearing 63 at the end of the flighting which may be moved inwardly and outward together with the flighting section 11D, the framework rods 62A sliding in bearing sleeves 62B secured to the tubing 11. This movement is controlled by a manually operated clasp linkage on each side of the auger tube, which snaps over-center for engagement. Position 64 illustrated in phantom on one side shows the engaged configuration while position 62 in solid line on the other side shows it in the disengaged position. Linkage tension adjustment is made by adjustably securing the pivot point 66 along the framework rods 62A. For reengaging the intake, the flighting is simply moved back up until the aligning cones couple. The drive pins will automatically contact during some portion of the first revolution.

The use of the hydraulic drive system to power the auger flighting is ideal for units equipped with a pneumatic system since it allows the speed of the auger flighting to be controlled so that the pneumatic and mechanical conveying rates may be matched.

The undercarriage system itself, along with the lift and drive mechanisms is also adaptable to other types of conveyors, such as belt or chain conveyors, which are used for handling other commodities. In such cases the auger tube would be replaced by another type of conveyor framework.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger for mounting to an associated tractor, having a longitudinal axis along which it normally moves, a drawbar hitch and a PTO at a rear position thereof in side by side relationship therewith, said assembly comprising in combination a freestanding tricycle undercarriage including a frame having a rear axle member arranged transverse to a longitudinal axis of said auger, a pair of spaced apart rear ground engaging wheels on respective ends of said axle member and a front castor wheel assembly mounted to said frame forwardly of said axle member, an auger tube having an inlet end and a discharge end and arranged substantially along said auger axis with said discharge end forwardly of said axle, means mounting said auger tube on said undercarriage for movement thereof so as to raise and lower said inlet and discharge ends from a transport position to various working positions and vice-versa, said frame including hitch means connected to said transverse axle member adjacent one rear wheel thereof and extending forwardly therefrom for connection to said drawbar hitch and interconnecting means arranged generally transverse to said auger axis and attached to said frame forwardly of said axle for connecting said frame to said tractor at a position thereof forwardly of said drawbar hitch whereby, when connected, said tractor can move said auger with the auger axis held parallel to the tractor axis, and drive connection means for taking drive from said PTO to drive said auger.

2. The invention according to claim 1 in which said interconnecting means includes a transversely extending telescopic brace member secured by one end thereof to said frame for adjustment therealong and by the other end thereof to adjacent one of the front and side of the associated tractor.

3. The invention according to claim 1 in which said means for mounting said auger tube to said undercarriage includes front lift linkage operatively extending between said frame and said auger assembly and rear lift linkage also operatively extending between said frame and said auger assembly, said front lift linkage including a pair of front members pivotally secured by one end thereof, one to each side of said frame and converging upwardly to a common apex, a roller assembly mounted at said apex, a longitudinally extending track means on said auger assembly mounting said roller assembly for movement therealong, and means to move said roller assembly along said track means for raising and lowering the outlet end of said auger assembly, said rear lift linkage including a pair of rear members pivotally secured by one end thereof in spaced apart relationship to said rear axle, one upon each side of said auger assembly and inclining upwardly to be pivotally mounted by the other ends thereof, one to each side of said auger assembly adjacent the intake end thereof and a hydraulic piston and cylinder operatively extending between said undercarriage and said rear members for raising and lowering the intake end of said auger assembly.

4. The invention according to claim 1 which includes a pneumatic conveyor assembly operatively connected to said auger tube for conveying grain to said auger tube, said tube including an auger flight component rotatably mounted therein, said last mentioned means including a suction nozzle, means to move air through said suction nozzle, grain and air separating means mounted on said auger tube, said grain and air separating means including grain and air intake means, air outlet means and separate grain outlet means, means operatively connecting said suction nozzle to said grain and air intake means, and means operatively connecting said grain outlet means to said auger flight component through said auger tube intermediate the ends thereof, and means operatively connecting said pneumatic conveyor to the power take-off of the associated tractor.

5. The invention according to claim 4 in which said auger flight component includes an upper section and a lower section, means detachably connecting said sections together at a location below said means operatively connecting said grain outlet means to said auger flight component through said auger casing, means to move said lower section into and out of operative engagement with said upper section, said last mentioned means including a framework, operatively supporting said lower section for rotation, means mounting said framework for selective endwise movement to said auger tube and over-center locking means for moving said lower section into and out of engagement with said upper section and for detachably locking said lower section into engagement with said upper section.

6. The invention according to claim 1 in which said drive connection means includes a right angle gear box rearwardly of the tractor and a telescopic drive shaft connected by one end thereof to said power take-off and by the other end thereof to said auger tube.

7. The invention according to claim 1 in which said drive connection means includes a belt drive assembly operatively extending between said power take-off and said auger tube.

8. The invention according to claim 3 in which said drive connection means includes a cross shaft on said undercarriage passing through the lower pivot of said rear lift linkage and a belt drive assembly operatively extending between said shaft and a gear box on said conveyor assembly such that its center line is common with that of the upper pivot of the rear lift linkage.

9. The assembly according to claim 1 in which said drive connection means includes a hydraulic pump operatively connected to said power take-off, a reservoir operatively connected to said hydraulic pump, valve control means operatively connected to said hydraulic pump, said hydraulic pump being operatively connected to said conveyor assembly.

* * * * *